US009174748B2

(12) United States Patent
Umlauft et al.

(10) Patent No.: US 9,174,748 B2
(45) Date of Patent: Nov. 3, 2015

(54) RAIL SYSTEM AND METHOD AND SYSTEM FOR MOUNTING A COMPONENT IN AN AIRCRAFT

(75) Inventors: Sebastian Umlauft, Hamburg (DE); Ralf Koblitz, Hamburg (DE); Niklas Halfmann, Hamburg (DE); Dieter Krause, Buchholz (DE); Christoph Blees, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 274 days.

(21) Appl. No.: 13/643,701
(22) PCT Filed: Apr. 26, 2011
(86) PCT No.: PCT/EP2011/002087
§ 371 (c)(1),
(2), (4) Date: Feb. 1, 2013
(87) PCT Pub. No.: WO2011/134640
PCT Pub. Date: Nov. 3, 2011

(65) Prior Publication Data
US 2013/0126673 A1  May 23, 2013

Related U.S. Application Data

(60) Provisional application No. 61/327,813, filed on Apr. 26, 2010.

(30) Foreign Application Priority Data

Apr. 26, 2010  (DE) .......................... 10 2010 018 272

(51) Int. Cl.
*B64F 5/00* (2006.01)
*B64C 1/20* (2006.01)

(52) U.S. Cl.
CPC ................. *B64F 5/0009* (2013.01); *B64C 1/20* (2013.01); *B64F 5/0036* (2013.01)

(58) Field of Classification Search
CPC ........ B64F 5/0009; B64F 5/0036; B64C 1/20
See application file for complete search history.

(56) References Cited

U.S. PATENT DOCUMENTS 5,090,639 A    2/1992 Miller et al.
2012/0312920 A1 * 12/2012 Huber et al. ................ 244/118.1

FOREIGN PATENT DOCUMENTS

DE    1 198 680        8/1965
DE    20 2004 007781   8/2004
(Continued)

OTHER PUBLICATIONS
International Search Report for PCT/EP2011/002087, mailed Oct. 7, 2011.

*Primary Examiner* — Valentina Xavier
(74) *Attorney, Agent, or Firm* — Nixon & Vanderhye P.C.

(57) ABSTRACT

A rail system for use when assembling a component in an aircraft comprises a first rail element having a securing device which is designed to be complementary to a first securing device provided in the region of a floor of an aircraft fuselage element and is adapted to cooperate with the first securing device in order to releasably secure the first rail element in the region of the floor of the aircraft fuselage element, wherein a section of the first rail element projects beyond an edge of the floor of the aircraft fuselage element in the connected state of the first rail element and the aircraft fuselage element. The first rail element furthermore comprises a guide device, which is designed to be complementary to a first guide device provided on an assembly aid, which is to be introduced into the aircraft fuselage element, and is adapted to cooperate with the first guide device to enable a guided displacement of the assembly aid to be introduced into the aircraft fuselage element relative to the rail system. The rail system furthermore comprises a second rail element having a securing device which is designed to be complementary to a second securing device provided in the region of the floor of the aircraft fuselage element and is adapted to cooperate with the second securing device in order to releasably secure the second rail element in the region of the floor of the aircraft fuselage element, wherein a section of the second rail element projects beyond an edge of the floor of the aircraft fuselage element in the connected state of the second rail element and the aircraft fuselage element. The second rail element furthermore comprises a guide device, which is designed to be complementary to a second guide device provided on an assembly aid, which is to be introduced into the aircraft fuselage element, and is adapted to cooperate with the second guide device to enable a guided displacement of the assembly aid to be introduced into the aircraft fuselage element relative to the rail system.

15 Claims, 8 Drawing Sheets

(56) References Cited

FOREIGN PATENT DOCUMENTS

| | | |
|---|---|---|
| DE | 698 34 797 | 6/2007 |
| DE | 10 2009 023 391 | 12/2010 |
| DE | 10 2009 023 393 | 12/2010 |
| EP | 2 062 815 | 5/2009 |
| GB | 2 419 854 | 5/2006 |

\* cited by examiner

RAIL SYSTEM AND METHOD AND SYSTEM FOR MOUNTING A COMPONENT IN AN AIRCRAFT

This application is the U.S. national phase of International Application No. PCT/EP2011/002087, filed 26 Apr. 2011, which designated the U.S. and claims priority to German Application No. 10 201 0 018 272.9, filed 26 Apr. 2010, and claims the benefit of U.S. Provisional Application No. 61/327,813, filed 26 Apr. 2010, the entire contents of each of which are hereby incorporated by reference.

The invention relates to a rail system which is suitable for use when assembling a component, in particular an interior component or an interior component module, in an aircraft. The invention furthermore relates to a method and a system for assembling a component, in particular an interior component, in an aircraft.

When assembling components, in particular interior components, in an aircraft, it is currently usual to connect components, such as dado panels, side trim elements, ceiling trim elements, lighting strips, overhead bins and the like, individually to the aircraft structure. Since each component has to be positioned and secured to the aircraft structure separately, the assembly of these components is very time consuming. Similarly, pipelines serving for example as air conducting lines of an aircraft air conditioning system or for water supply in an aircraft cabin and also electrical lines currently have to be individually secured to the aircraft structure in time-consuming manner. After the assembly process, the proper functioning of all lines has to be checked within the framework of a final inspection. It is particularly necessary for all pipelines to undergo a leak test, whilst the electrical lines require checking of all interfaces. These tests are likewise relatively complex since the lines and interfaces to be checked are often only poorly accessible in the assembled state of the lines.

For this reason, attempts have been made to pre-assemble and test components provided for assembly in an aircraft, for example interior components provided for assembly in an aircraft cabin, as comprehensively as possible outside the aircraft. In particular, the aim is for large modules, which can comprise a plurality of overhead stowage bins, a plurality of side trim panels and further interior components, such as electrical lines, air conducting lines of an aircraft air conditioning system or pipelines serving for the water supply in the aircraft cabin, personal service units and personal service channels, to be pre-assembled and tested outside the aircraft, possibly with the aid of a corresponding assembly device described in the unpublished DE 10 2009 023 391. Large modules should then be transported into a final assembly position in an aircraft fuselage element, for example by means of a transport device described in the likewise unpublished DE 10 2009 023 393.

The invention is based on the object of providing a rail system which enables an assembly aid used during assembly of a component, in particular an interior component or an interior component module in an aircraft, for example a transport device described in DE 10 2009 023 393, or another assembly aid, to be introduced into the aircraft fuselage element at a defined spacing from an aircraft structure. The invention is furthermore based on the object of providing a method and a system for assembling a component, in particular an interior component or an interior component module, in an aircraft using a rail system of this type.

This object is achieved by a rail system for use when assembling a component, in particular an interior component in an aircraft having the features of claim 1, a method for assembling a component, in particular an interior component in an aircraft having the features of claim 12, and a system for assembling a component, in a particular an interior component in an aircraft having the features of claim 14.

The rail system according to the invention comprises a first rail element having a securing device which is designed to be complementary to a first securing device provided in the region of a floor of an aircraft fuselage element and is adapted to cooperate with the first securing device provided in the region of the floor of the aircraft fuselage element in order to releasably secure the first rail element in the region of the floor of the aircraft fuselage element, wherein a section of the first rail element projects beyond an edge of the floor of the aircraft fuselage element in the connected state of the first rail element and the aircraft fuselage element. That section of the first rail element which projects beyond the edge of the floor of the aircraft fuselage element may extend for example over a floor of an assembly hangar or the like and, if required, be adequately secured there. The aircraft fuselage element may be for example a fuselage shell which is open at least one end face. However, alternatively to this, the rail system according to the invention may also be provided to be introduced into an almost completely, or completely, constructed aircraft fuselage. It is merely essential that the aircraft fuselage element has an access for enabling the rail system and the components provided for assembly in the aircraft fuselage element to be introduced into the aircraft fuselage element.

The first securing device may be arranged for example in the region of a surface of a floor plate which is arranged in the aircraft fuselage element and is provided to form a cabin floor. As a result of the cooperation between the securing device of the first rail element and the first securing device provided on the aircraft fuselage element, the first rail element can be temporarily secured in the region of the floor of the aircraft element and dismounted again when it is no longer required.

The first rail element of the rail system furthermore comprises a guide device, which is designed to be complementary to a first guide device provided on an assembly aid, which is to be introduced into the aircraft fuselage element, and is adapted to cooperate with the first guide device provided on the assembly aid to be introduced into the aircraft fuselage element in order to enable guided displacement of the assembly aid to be introduced into the aircraft fuselage element relative to the rail system. The assembly aid to be introduced into the aircraft fuselage element may be for example a transport device described in DE 10 2009 023 393, but it may also be another assembly aid.

The rail system according to the invention furthermore comprises a second rail element having a securing device which is designed to be complementary to a second securing device provided in the region of the floor of the aircraft fuselage element and is adapted to cooperate with the second securing device provided in the region of the floor of the aircraft fuselage element in order to releasably secure the second rail element in the region of the floor of the aircraft fuselage element, wherein a section of the second rail element projects beyond an edge of the floor of the aircraft fuselage element in the connected state of the second rail element and the aircraft fuselage element. That section of the second rail element which projects beyond the floor of the floor of the aircraft fuselage element may extend for example over a floor of an assembly hangar or the like and, if required, be adequately secured there. Like the first securing device, the second securing device of the aircraft fuselage element may also be arranged in the region of a surface of a floor plate which is arranged in the aircraft fuselage element and is provided to form a cabin floor. The cooperation between the securing device of the second rail element and the second securing device of the aircraft fuselage element enables the second rail element, like the first rail element, to be temporarily secured in the region of the floor of the aircraft fuselage element and to be released from its position again in simple manner when it is no longer required.

Finally, the second rail element is also provided with a guide device, which is designed to be complementary to a second guide device provided on an assembly aid, which is to be introduced into the aircraft fuselage element, and is adapted to cooperate with the second guide device provided on the assembly aid to be introduced into the aircraft fuselage element in order to enable a guided displacement of the assembly aid to be introduced into the aircraft fuselage element relative to the rail system.

With the aid of the rail system according to the invention, it is possible for example for a transport device described in DE 10 2009 023 393, or another assembly aid, to be introduced in simple and comfortable manner into the aircraft fuselage element at a defined spacing from an aircraft structure. Damage to the aircraft structure, the transport device, the other assembly aid or the component to be assembled is thus reliably prevented. By positioning the rail system accordingly, it is furthermore possible to move the component to be assembled into a suitable assembly position in simple and reproducible manner. Finally, the rail system according to the invention can be used simply and flexibly since the individual rail elements of the rail system can be simply and quickly installed in the aircraft fuselage element and removed from the aircraft fuselage element again. Using the rail system according to the invention, it is therefore possible to devise the process for assembling a component, in particular an interior component, in an aircraft such that it is altogether more simple and efficient.

The first and/or the second rail element of the rail system may essentially be constructed in one part. However, as an alternative to this, the first rail element may also be constructed in two parts, wherein a section of the first rail element is received completely in the aircraft fuselage element in the connected state of the first rail element and the aircraft fuselage element and a section of the first rail element projects beyond the edge of the floor of the aircraft fuselage element and extends for example over a floor of an assembly hangar or the like. The second rail element may furthermore be constructed in two parts, wherein a section of the second rail element is received completely in the aircraft fuselage element in the connected state of the second rail element and the aircraft fuselage element and a section of the second rail element projects beyond the edge of the floor of the aircraft fuselage element and extends for example over a floor of an assembly hangar or the like.

The securing device of the first rail element is preferably designed to be complementary to a first securing device which is provided in the region of the floor of the aircraft fuselage element and is constructed in the form of a seat rail. Alternatively or additionally to this, the securing device of the second rail element may also be designed to be complementary to a second securing device which is provided in the region of the floor of the aircraft fuselage element and is constructed in the form of a seat rail. The first and/or the second rail element of the rail system according to the invention can be installed in simple manner in the aircraft fuselage element, at least in sections, without requiring the provision of a separate first and/or second securing device on the aircraft fuselage element.

The first rail element may comprise a base body on which the securing device of the first rail element is mounted. Alternatively or additionally to this, the second rail element may also comprise a base body on which the securing device of the second rail element is mounted. The base body of the first and/or the second rail element may be constructed for example in the form of an elongated cuboid. The securing device may be mounted for example in the region of a surface of the base body which, in the assembled state of the first and/or the second rail element in the aircraft fuselage element, faces the first or the second securing device of the aircraft fuselage element. For example, a plurality of projections which are provided to be received in a seat rail forming the first and/or the second securing device of the aircraft fuselage element may be provided on the surface of the base body which, in the assembled state of the first and/or the second rail element in the aircraft fuselage element, faces the first or second securing device of the aircraft fuselage element.

In a preferred embodiment of the rail system according to the invention, the first rail element comprises a support element which is connected to the base body of the first rail element by way of at least one connecting element. Alternatively or additionally to this, the second rail element may also comprise a support element which is connected to the base body of the second rail element by way of at least one connecting element.

The support element of the first rail element may extend for example substantially parallel to the base body of the first rail element. Alternatively or additionally to this, the support element of the second rail element may extend substantially parallel to the base body of the second rail element.

The guide device of the first rail element may be mounted on the base body and/or the support element of the first rail element. Alternatively or additionally to this, the guide device of the second rail element may be mounted on the base body and/or the support element of the second rail element. A rail element which does not comprise a support element and whereof the guide device is mounted on the base body of the rail element is notable for a particularly simple construction. On the other hand, a rail element equipped with a support element supporting a guide device enables the guide device to be arranged in a position in the aircraft fuselage element which is removed from the position of the first and/or second securing device provided in the aircraft fuselage element. The mutual spacing between the guide devices provided on the first and the second rail element of the rail element can therefore be adapted flexibly to the spacing between the first and second guide devices provided on the assembly aid to be introduced into the aircraft fuselage element. With a first and/or second rail element which is constructed in two parts, only that section of the rail element which is received completely in the aircraft fuselage element in the connected state of the first and/or second rail element and the aircraft fuselage element is preferably provided with a support element.

According to requirements, both the first and the second rail element of the rail system may be designed without a support element and provided with a guide device mounted on the base body of the rail element. Such a design of the rail system is then presented for example when two seat rails incorporated in a floor plate of the aircraft fuselage element are used as first and second securing devices provided on the aircraft fuselage element and the spacing between the first and second guide devices provided on the device to be introduced into the aircraft fuselage element corresponds to the spacing between the seat rails in the aircraft fuselage element. Alternatively to this, both the first rail element and the second rail element may be provided with a support element and a guide device mounted on the support element if the spacing between the first and second guide device provided on the assembly aid to be introduced into the aircraft fuselage element is greater or smaller than a spacing between seat rails which form the first and the second securing device of the aircraft fuselage element and are integrated in a floor plate of the aircraft fuselage element.

Finally, a configuration is also conceivable in which a rail element merely comprises a base body and a guide device mounted on the base body and the other rail element comprises a support element and a guide device mounted on the support element. In such a construction of the rail system according to the invention, at least one rail element can be of a simple design and the spacing between the guide devices provided on the rail elements can still be independent of the spacing between the seat rails which are provided in the floor plate of the aircraft fuselage element and form the first and the second securing device of the aircraft fuselage element.

If desired, the first and/or the second rail element may furthermore also be designed so that both the base body and a support element of the first and/or the second rail element support a guide device. Such a design of the rail system is presented in particular when more than two guide devices are provided on the assembly aid to be introduced into the aircraft fuselage element.

The guide device of the first rail element and/or the guide device of the second rail element may comprise a guide rail which is adapted to come into engagement with a roller of the first and/or second guide device provided on the assembly aid to be introduced into the aircraft fuselage element. The roller may be provided with a groove for example in the region of its circumferential face. The guide rail of the guide device of the first and/or the second rail element then preferably has a cross-section with a shape which is adapted to the shape of the groove incorporated in the circumferential face. For example, the guide rail may have a cross-section in the shape of a flattened circle or a semicircle.

The rail system according to the invention furthermore preferably comprises a stop element which, in the assembled state of the rail element in an aircraft fuselage element, is designed to cooperate with the assembly aid to be introduced into the aircraft fuselage element in order to limit the guided displacement of the assembly aid to be introduced into the aircraft fuselage element relative to the rail system. The stop element can preferably be secured in different positions on the rail system by means of an assembly device. The assembly device may be constructed for example in the form of an assembly rail which extends substantially parallel to the first and/or the second rail element. With such a design of the assembly device, the stop element can be fixed in simple and comfortable manner in various positions along a longitudinal axis of the rail system.

For example, the assembly device may be mounted on a connecting element for connecting the base body of the first and/or the second rail element to the support element of the first and/or the second rail element.

The basic shape of the first and/or the second rail element may be substantially linear over its/their entire length. However, if desired, the basic shape of the first and/or the second rail element may also be curved, at least in sections. As a result of the first and/or the second rail element being of a curved construction, at least in sections, the rail system may be equipped for example with a first section extending substantially perpendicularly to a longitudinal axis of the aircraft fuselage element, a curved second section and a third section extending substantially parallel to the longitudinal axis of the aircraft fuselage element. Therefore, the rail elements of the rail system can be introduced into the aircraft fuselage element for example through a side door constructed in the aircraft fuselage element and then be guided in the aircraft fuselage element parallel to the longitudinal axis of the aircraft fuselage element.

In a method according to the invention for assembling a component, in particular an interior component, in an aircraft, the first and the second rail element of the rail system described above are secured in an aircraft fuselage element. An assembly aid, for example a transport device described in DE 10 2009 023 393 or another assembly aid is then introduced into the aircraft fuselage element. During this, the first guide device provided on the assembly aid to be introduced into the aircraft fuselage element cooperates with the complementary guide device of the first rail element. Furthermore, the second guide device provided on the assembly aid to be introduced into the aircraft fuselage element cooperates with the complementary guide device of the second rail element. This enables a guided displacement of the assembly aid to be introduced into the aircraft fuselage element relative to the rail system.

In a preferred embodiment of the method, the component is assembled in the aircraft fuselage element using the assembly aid. The assembly aid is then removed from the aircraft fuselage element, whereupon the first guide device provided on the assembly aid to be removed from the aircraft fuselage element cooperates with the complementary guide device of the first rail element and the second guide device provided on the assembly aid to be removed from the aircraft fuselage element cooperates with the complementary guide device of the second rail element in order to enable a guided displacement of the assembly aid to be removed from the aircraft fuselage element relative to the rail system. Finally, the first and the second rail element of the rail system are released from the aircraft fuselage element.

A system according to the invention for assembling a component in an aircraft comprises a rail system described above and an assembly aid designed to cooperate with the rail system.

The assembly aid is preferably constructed in the form of a transport carriage for transporting the component into an aircraft fuselage element.

The invention is now explained in more detail with reference to the accompanying schematic drawings, which show:

FIGS. 4a and b the installation of the section shown in FIGS. 3a to c of the first rail element in the aircraft fuselage element;

A rail system 10 which is suitable for use when assembling a component in an aircraft comprises a first rail element 12 and a second rail element 14. The first rail element 12, like the second rail element 14, is constructed in two parts. The first rail element 12, which is shown in detail particularly in FIGS. 3a to c and 4a to b, comprises a base body 16 constructed in the form of an elongated cuboid. The base body 16 of the first rail element 12 has a first surface 18 and a second surface 20 opposite the first surface.

A securing device 22 is arranged in the region of the first surface 18 of the base body 16. As is most clearly shown in FIGS. 4a to b, the securing device 22 of the first rail element 12 is designed to be complementary to a first securing device 24 which is constructed in the form of a seat rail and is integrated in a floor plate 26 of an aircraft fuselage element 28. In particular, the securing device 22 of the first rail element 12 has a plurality of projections 30 which are provided to be received in the first securing device 24 of the aircraft fuselage element 28, which is constructed in the form of a seat rail, in order to secure the first rail element 12 in the region of a floor of the aircraft fuselage element 28, i.e. to the floor plate 26 of the aircraft fuselage element 28.

On the other hand, the second surface 20 of the base body 16 of the first rail element 12 supports a guide device 32 which comprises a guide rail 34 extending parallel to the base body 16. As shown most clearly in FIGS. 3a and 4a to b, the guide rail 34 extends over the entire length of the base body 16 of the first rail element 12 and has a cross-section designed in the shape of a flattened circle.

Figure 1:
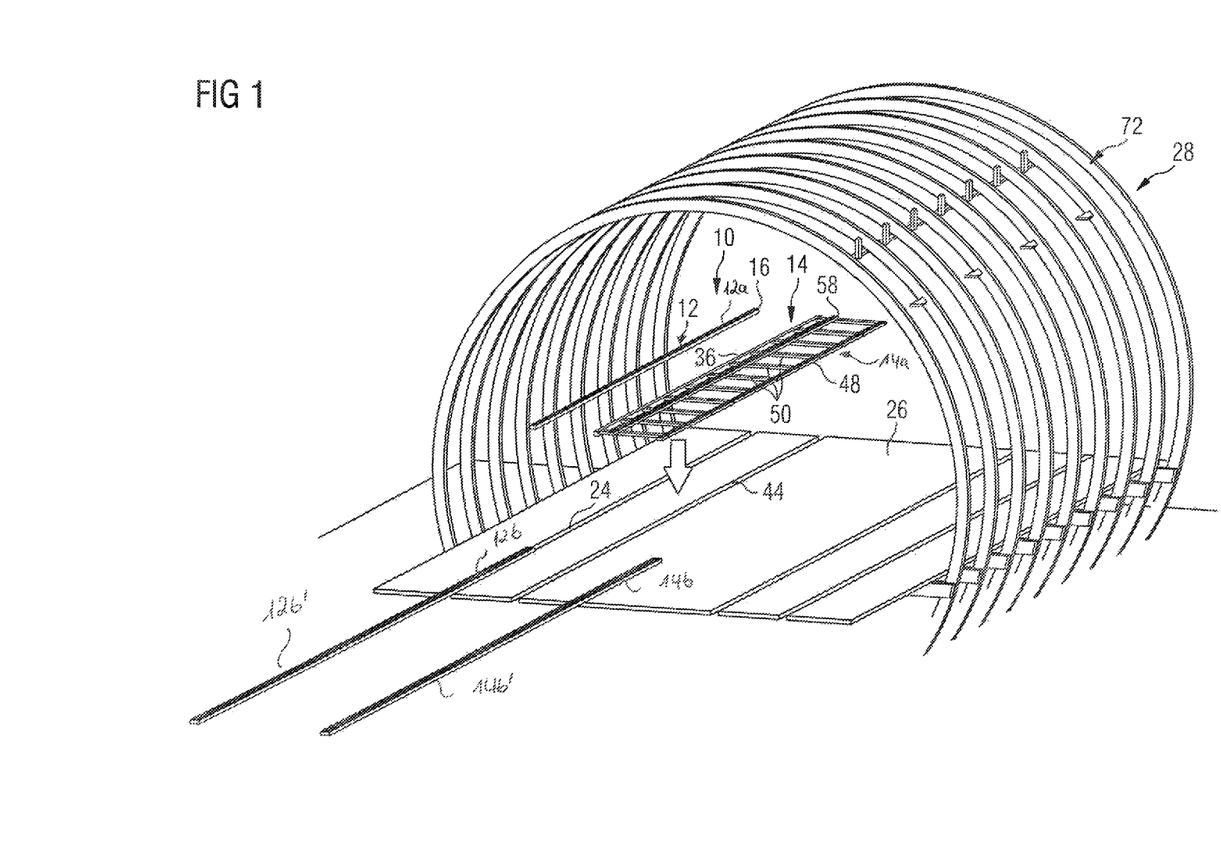
FIG. 1 a rail system suitable for use when assembling a component in an aircraft during its installation in an aircraft fuselage element.

A section 12a of the first rail element 12, which is not yet connected to the aircraft fuselage element 28 in FIG. 1, is designed to be received completely in the aircraft fuselage element 28. On the other hand, a section 12b of the first rail element 12, which is already connected to the aircraft fuselage element 28 in FIG. 1, has a section 12b' which projects over an edge of the aircraft fuselage element 28 in the connected state of the first rail element 12 and the aircraft fuselage element 28.

Like the first rail element 12, the second rail element 14 which is shown in particular detail in FIGS. 5a to c and 6 comprises a base body 36 which is constructed in the form of an elongated cuboid and has a first surface 38 and a second surface 40 opposite the first surface 38. Like the first rail element 12, in the region of the first surface 38 of the base body 36, the second rail element 14 is also equipped with a securing device 42 which is provided to cooperate with a second securing device 44 which is constructed in the form of a seat rail and integrated the floor plate 26 of the aircraft fuselage element 28. Like the securing device 22 of the first rail element 12, the securing device 42 of the second rail element 14 also has a plurality of projections 46 which are provided to be received in the second securing device 44 of the aircraft fuselage element 28 which is constructed in the form of a seat rail.

A section 14a of the second rail element 14, which is not yet connected to the aircraft fuselage element 28 in FIG. 1, is furthermore also arranged to be received completely in the aircraft fuselage element 28. On the other hand, a section 14b of the second rail element 14, which is already connected to the aircraft fuselage element 28 in FIG. 1, has a section 14b' which projects over an edge of the aircraft fuselage element 28 in the connected state of the second rail element 14 and the aircraft fuselage element 28.

The second rail element 14 differs from the first rail element 12 in terms of a support element 48 which, like the base body 36 of the second rail element 14, is constructed in the form of an elongated cuboid and extends along the section 14a of the second rail element 14 substantially parallel to the base body 36. The support element 48 is connected to the base body 36 of the second rail element 14 by way of a plurality of connecting elements 50. In the illustrated exemplary embodiment of a rail system 10, the connecting elements 50 extend parallel to one another and substantially perpendicularly to the base body 36 and the support element 48 of the second rail element 14. However, it goes without saying that other designs and arrangements of the connecting elements 50 are also possible.

Similarly to the first rail element 12, the second rail element 14 is also provided with a guide device 52 which comprises a guide rail 54 with a cross-section designed in the shape of a flattened circle. However, contrary to the first rail element 12, the guide device 52 is not arranged in the region of the second surface 40 of the base body 36 of the second rail element 14 but in the region of a surface 56 of the support element 48 of the rail element 14 which is parallel to the second surface 40 of the base body 36.

Figure 5:
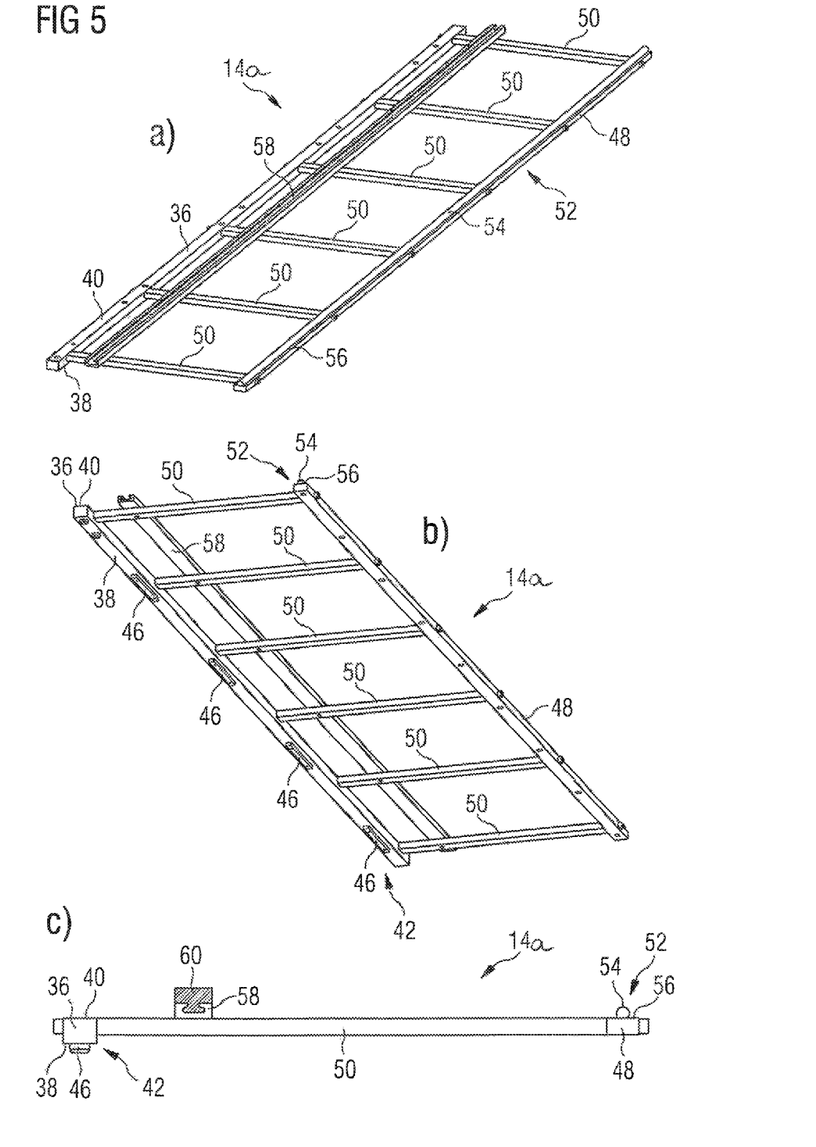
FIGS. 5a to c various views of a section of a second rail element of the rail system according to FIG. 1.
Figure 6:
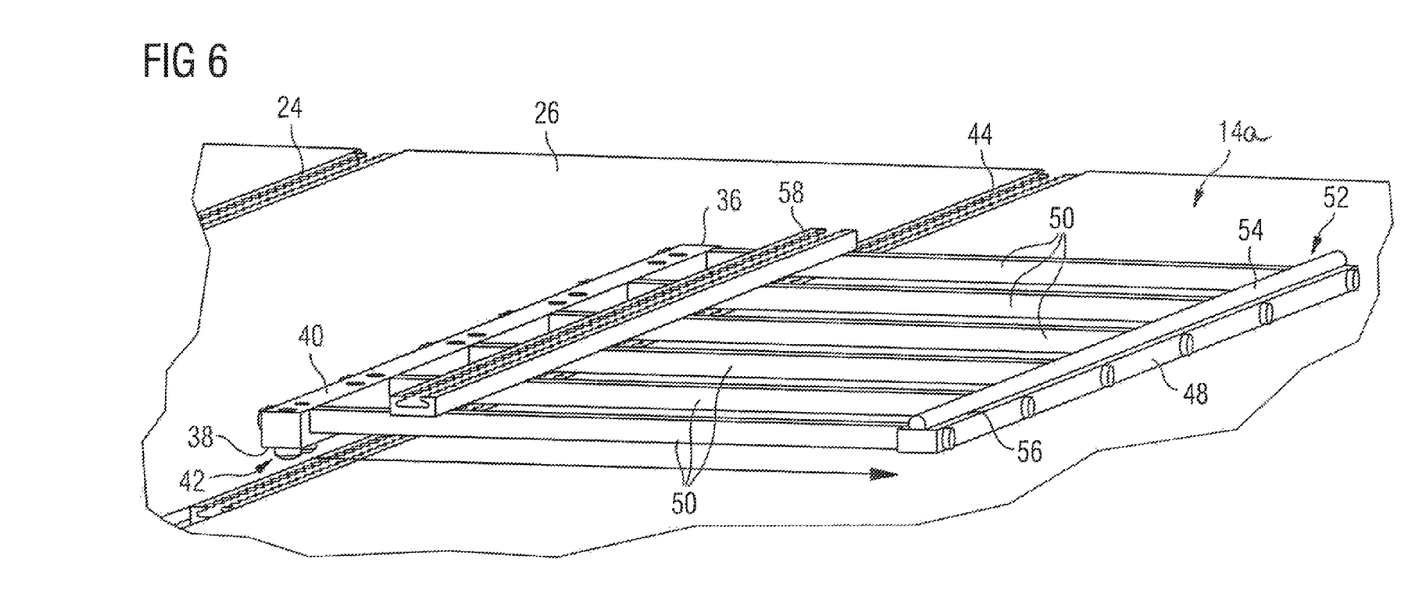
FIG. 6 the installation of the section shown in FIGS. 5a to 5c of the second rail element in the aircraft fuselage element.

Finally, the second rail element 14 comprises an assembly device 58 which is constructed in the form of an assembly rail and serves to secure a stop element 60 shown in FIG. 5c in various positions along a longitudinal axis L of the rail system 10 in various positions on the rail system 10. The assembly device 58 is secured to the connecting elements 50 connecting the base body 36 to the support element 48 of the second rail element 14 and extends substantially over the entire length of the second rail element 14.

Figure 2:
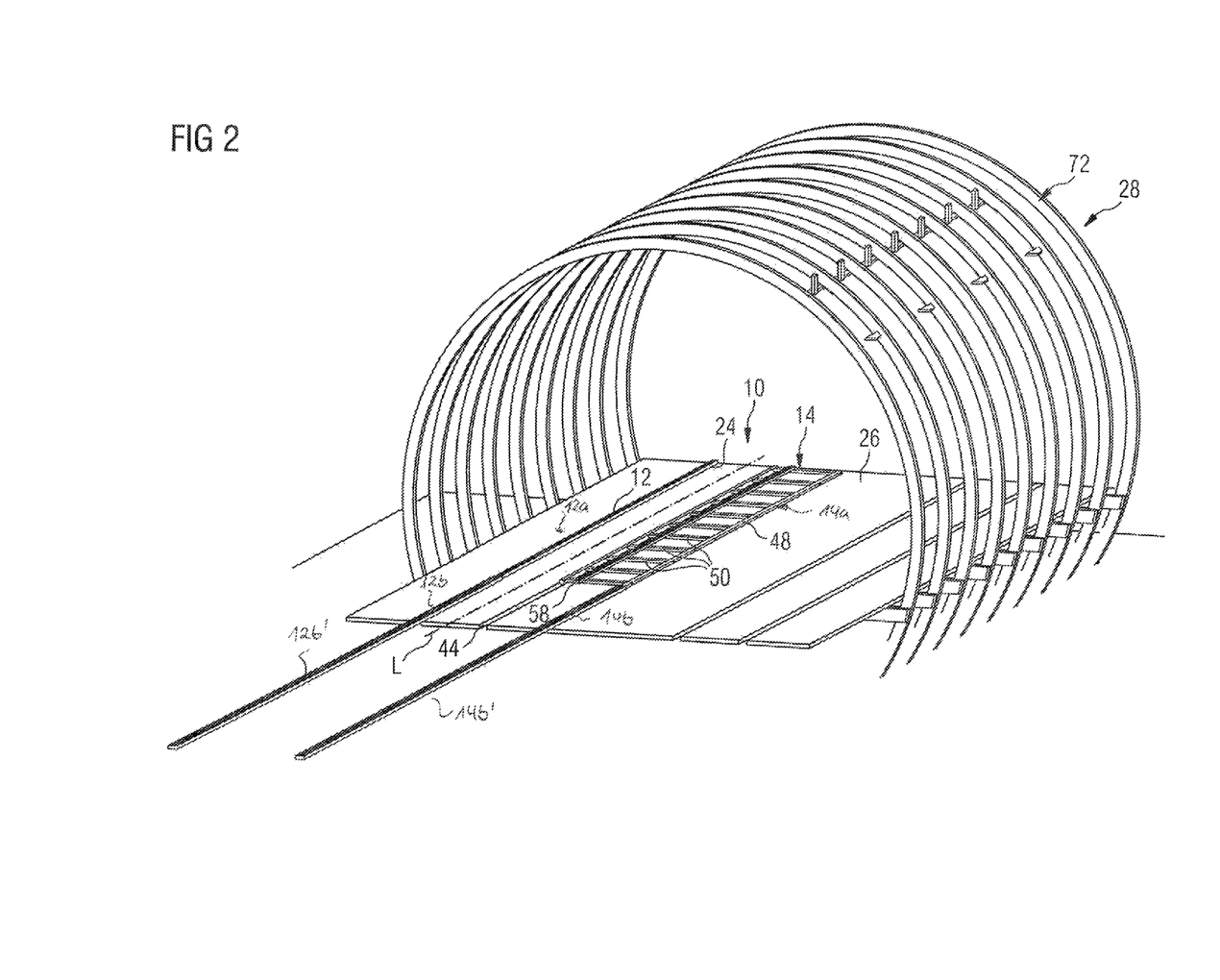
FIG. 2 the rail system shown in FIG. 1 in the installed state in the aircraft fuselage element.
Figure 3:
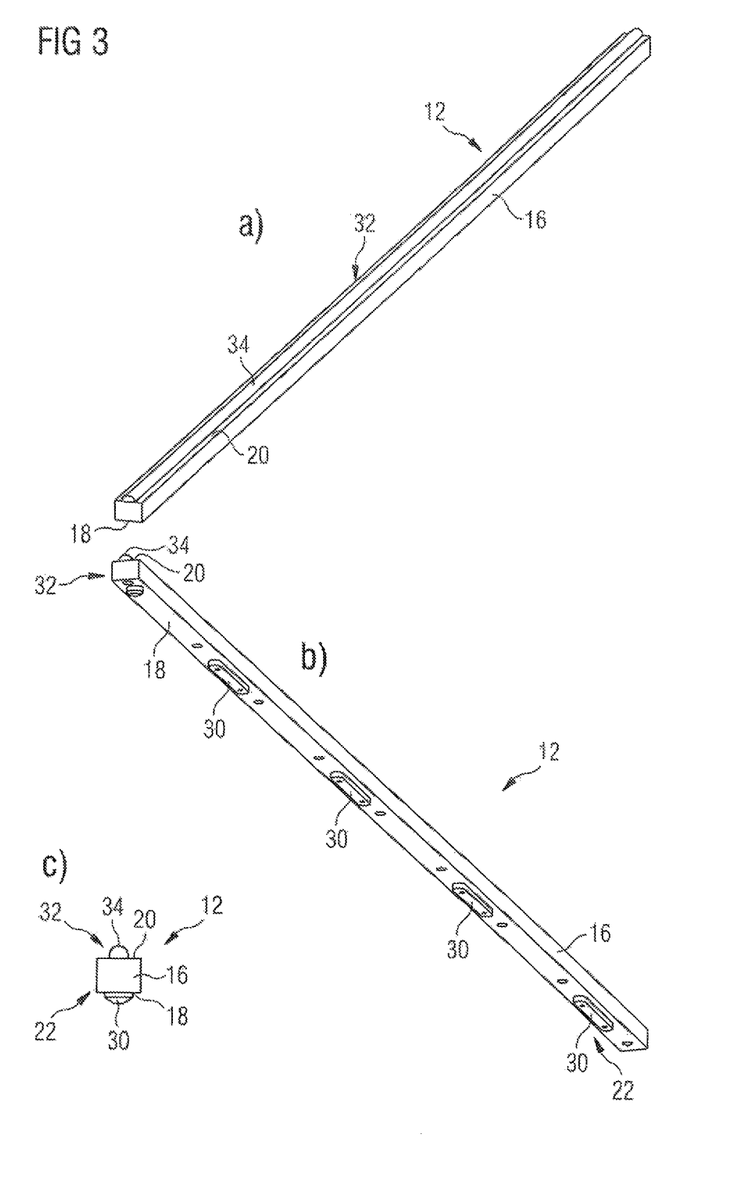
FIGS. 3a to c various views of a section of a first rail element of the rail system according to FIG. 1.
Figure 4:
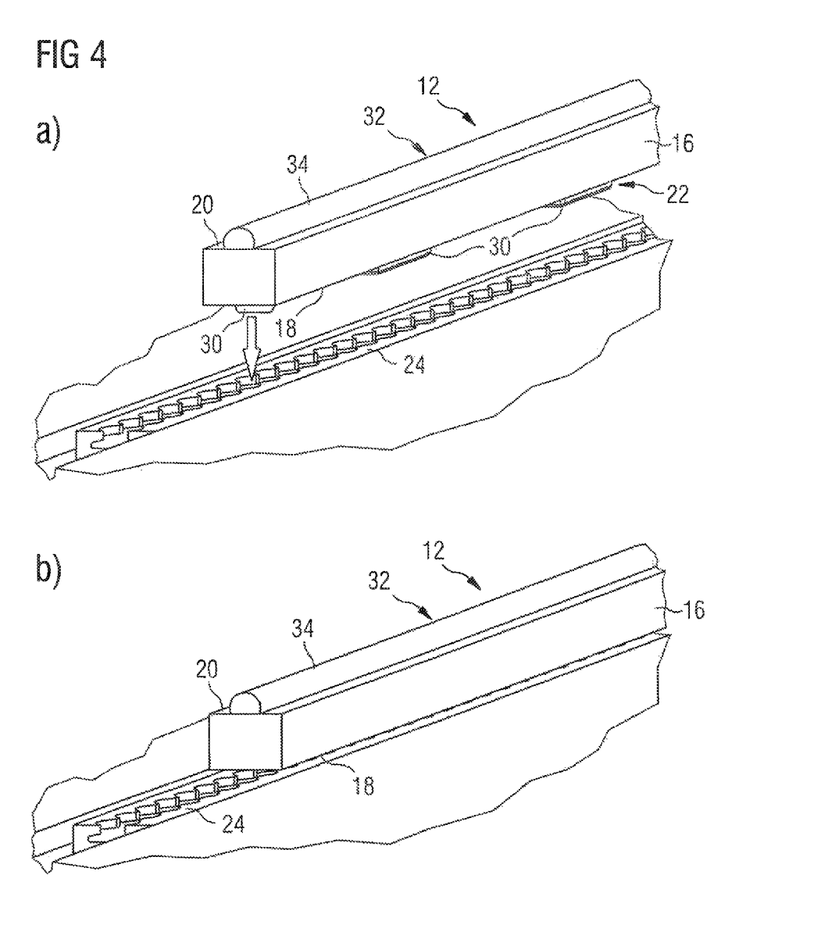

As is most clearly shown in FIGS. 1 and 2, the first rail element 12 can be assembled in simple and comfortable manner in the aircraft fuselage element 28 in that the securing device 22 constructed on the first rail element 12 is brought into engagement with the first securing device 24 of the aircraft fuselage element 28, which is constructed in the form of a seat rail. Similarly, the second rail element 24 can be assembled in simple manner in the aircraft fuselage element 28 in that the securing device 42 constructed on the second rail elements 14 is brought into engagement with the second securing device 44 of the aircraft fuselage element 28, which is likewise constructed in the form of a seat rail. It is therefore possible to dispense with providing separate securing devices in the aircraft fuselage element 28 for securing the rail elements 12, 14. It goes without saying that the rail elements 12, 14 are releasably secured in the aircraft fuselage element 28 so that the rail elements 12, 14 can be readily dismantled again at a later time and removed from the aircraft.

Figure 7:
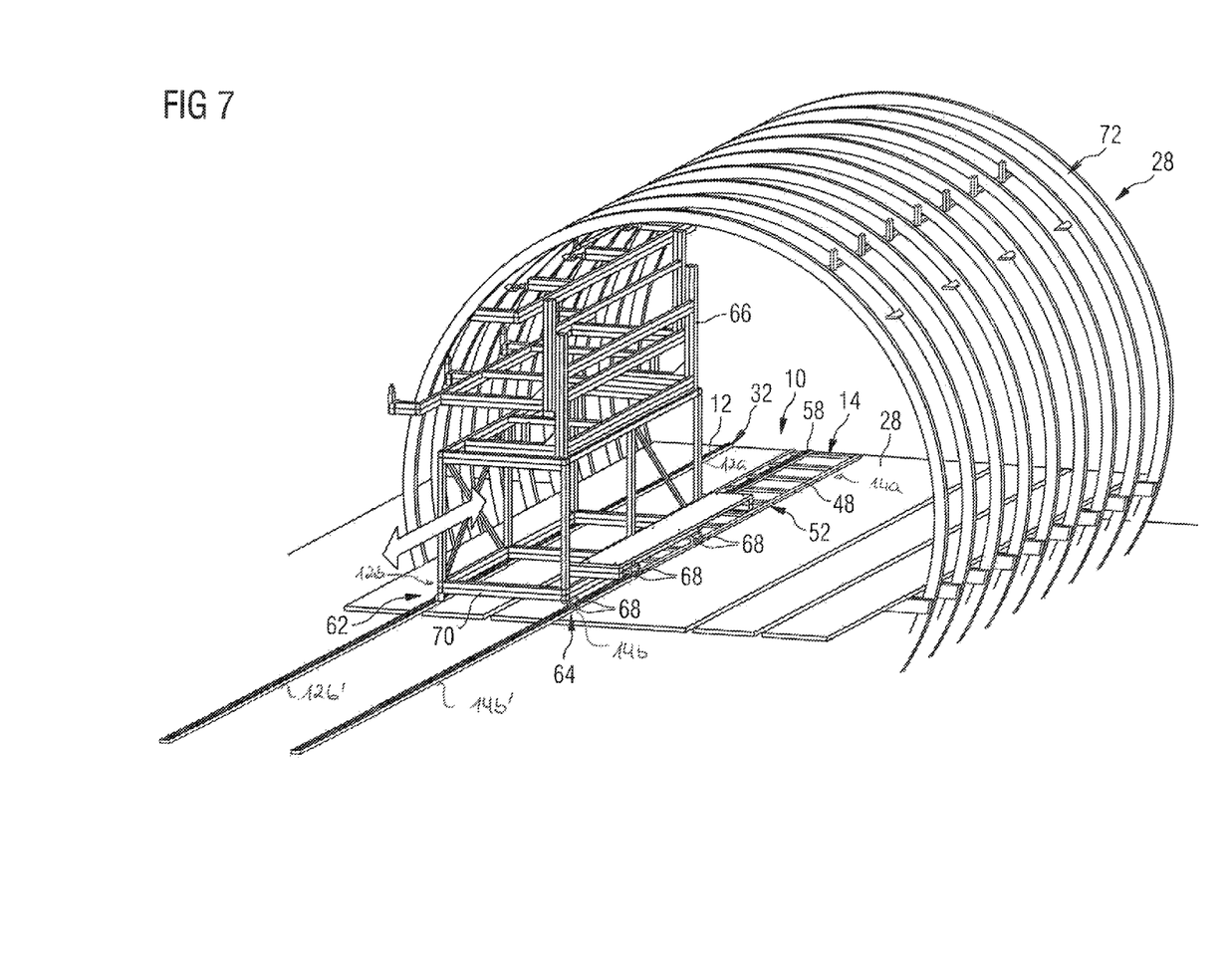
FIG. 7 the introduction of a transport device for transporting a component to be assembled in the aircraft fuselage element into the aircraft fuselage element using the rail system according to FIG. 1.

In the assembled state in the aircraft fuselage element 28, the rail system 10 provides two mutually parallel extending guide devices 32, 52 whereof the spacing is not linked to the spacing of the first and the second securing device 24, 42 of the aircraft fuselage element 28. Instead the arrangement of the guide devices 32, 52 of the rail elements 12, 14 is adapted to the arrangement of first and second guide devices 62, 64 which are provided in the aircraft fuselage element 28 on a transport device 66 for transporting a component provided for assembly in the aircraft fuselage element 28 (see FIG. 7). Like the second guide device 64 of the transport device 66, the first guide device 62 of the transport device 66 comprises a plurality of rollers 68 which are assembled on a base frame 70 of the transport device 66.

A respective groove (not illustrated in the Figures), the shape of which is adapted to the cross-section of the guide rails 34, 54 of the guide devices 32, 52, is constructed in a circumferential face of the rollers 68. Upon a displacement of the transport device 66 relative to the rail system 10, the guide rails 34, 54 of the guide devices 32, 52 are therefore received in the grooves constructed in the circumferential faces of the rollers 68 of the first and the second guide device 62, 64 of the transport device 66. This enables a guided displacement of the transport device 66 relative to the rail system 10 along the longitudinal axis L of the rail system 10. The transport device 66 is thus held at a defined spacing from a structure 72 of the aircraft fuselage element 28, as is a component transported on the transport device 66.

Figure 8:
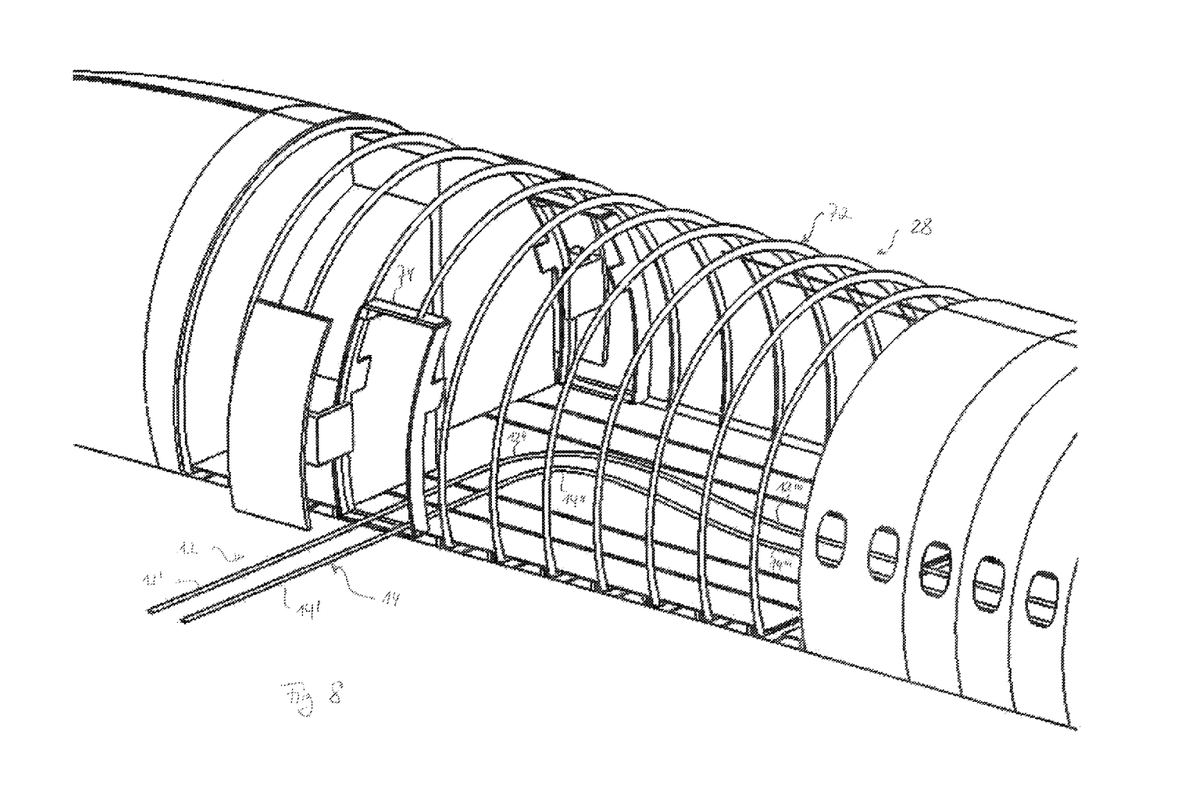
FIG. 8 a further rail system suitable for use when assembling a component in an aircraft in the installed state in an aircraft fuselage element.

FIG. 8 shows an embodiment of a rail system 10 in which sections of the first and the second rail element 12, 14 have a curved basic shape. In particular, the rail elements 12, 14 each have a first section 12', 14' extending substantially perpendicularly to a longitudinal axis of the aircraft fuselage element, a curved second section 12", 14" and third section 12'", 14'" extending substantially parallel to the longitudinal axis of the aircraft fuselage element. This enables the rail elements 12, 14 of the rail system 10 to be introduced into the aircraft fuselage element 28 through a side door 74 constructed in the aircraft fuselage element 28 and then be guided in the aircraft fuselage element 28 parallel to the longitudinal axis of the aircraft fuselage element 28. Therefore, an assembly aid, for example a transport device 66, can be introduced into the aircraft fuselage element 28 through the side door 74 (see FIG. 7).

In the illustration according to FIG. 8, the first and the second rail element 12, 14 merely have a respective base body. It goes without saying that rail elements 12, 14 with basic shape which is curved in sections can also be constructed as described above and equipped for example with a support element. The features described above in connection with the arrangement according to FIGS. 1 to 7 are therefore transferrable without limitations to the arrangement according to FIG. 8.

The invention claimed is:

1. A rail system for use when assembling a component in an aircraft, which rail system comprises:
    a first rail element having a securing device which is configured to be complementary to a first securing device provided in the region of a floor of an aircraft fuselage element and is configured to cooperate with the first securing device to releasably secure the first rail element in the region of the floor of the aircraft fuselage element and is configured to extend over a floor of an assembly hanger, wherein a section of the first rail element projects beyond an edge of the floor of the aircraft fuselage element in the connected state of the first rail element and the aircraft fuselage element, and having a guide device, which is configured to be complementary to a first guide device provided on an assembly aid, which is to be introduced into the aircraft fuselage element, and is configured to cooperate with the first guide device to enable a guided displacement of the assembly aid to be introduced into the aircraft fuselage element relative to the rail system, and
    a second rail element having a securing device which is configured to be complementary to a second securing device provided in the region of the floor of the aircraft fuselage element and is configured to cooperate with the second securing device in order to releasably secure the second rail element in the region of the floor of the aircraft fuselage element and is configured to extend over a floor of an assembly hanger, wherein a section of the second rail element projects beyond an edge of the floor of the aircraft fuselage element in the connected state of the second rail element and the aircraft fuselage element, and having a guide device, which is configured to be complementary to a second guide device provided on an assembly aid, which is to be introduced into the aircraft fuselage element, and is configured to cooperate with the second guide device to enable a guided displacement of the assembly aid to be introduced into the aircraft fuselage element relative to the rail system.

2. The rail system according to claim 1, wherein at least one of the first rail element is constructed in two parts, wherein a first section of the first rail element is received completely in the aircraft fuselage element in the connected state of the first rail element and the aircraft fuselage element, and a section of the first rail element projects beyond the edge of the floor of the aircraft fuselage element, and the second rail element is constructed in two parts, wherein a section of the second rail element is received completely in the aircraft fuselage element in the connected state of the second rail element and the aircraft fuselage element and a section of the second rail element projects beyond the edge of the floor of the aircraft fuselage element.

3. The rail system according to claim 1, wherein at least one of the securing device of the first rail element is designed to be complementary to a first securing device of the aircraft fuselage element which is constructed in the form of a seat rail, and the securing device of the second rail element is designed to be complementary to a second securing device of the aircraft fuselage element which is constructed in the form of a seat rail.

4. The rail system according to claim 1, wherein at least one of the first rail element comprises a base body on which the securing device of the first rail element is mounted, and the second rail element comprises a base body on which the securing device of the second rail element is mounted.

5. The rail system according to claim 4, wherein at least one of the first rail element comprises a support element which is connected to the base body of the first rail element by way of at least one connecting element, and the second rail element comprises a support element which is connected to the base body of the second rail element by way of at least one connecting element.

6. The rail system according to claim 5, wherein at least one of the support element of the first rail element extends substantially parallel to the base body of the first rail element and the support element of the second rail element extends substantially parallel to the base body of the second rail element.

7. The rail system according to claim 4, wherein at least one of the guide device of the first rail element is mounted on the base body and/or the support element of the first rail element and the guide device of the second rail element is mounted on the base body and/or the support element of the second rail element.

8. The rail system according to claim 1, wherein at least one of the guide device of the first rail element and the guide device of the second rail element comprise(s) a guide rail which is designed to come into engagement with a roller of the first and/or second guide device provided on the assembly aid to be introduced into the aircraft fuselage element.

9. The rail system according to claim 1,
    further comprising a stop element which is designed such that, in the assembled state of the rail system in an aircraft fuselage element, it cooperates with the assembly aid to be introduced into the aircraft fuselage element in order to delimit the guided displacement of the assembly aid to be introduced into the aircraft fuselage element relative to the rail system, wherein the stop element can be secured in various positions on the rail system by means of an assembly device.

10. The rail system according to claim 9,
    wherein the assembly device is mounted on a connecting element for connecting the base body of the first and/or the second rail element to the support element of the first and/or the second rail element.

11. The rail system according to claim 1, wherein the first rail element has a curved basic shape, at least in sections, and/or the second rail element has a curved basic shape, at least in sections.

12. A method for assembling a component in an aircraft comprising:

securing the first and the second rail element of the rail system according to claim 1 in an aircraft fuselage element, and introducing an assembly aid into the aircraft fuselage element, wherein the first guide device provided on the assembly aid to be introduced into the aircraft fuselage element cooperates with the complementary guide device of the first rail element and the second guide device provided on the assembly aid to be introduced into the aircraft fuselage element cooperates with the complementary guide device of the second rail element in order to enable a guided displacement of the assembly aid to be introduced into the aircraft fuselage element relative to the rail system.

13. The method according to claim 12, further comprising:

assembling the component in the aircraft fuselage element with the aid of the assembly aid, removing the assembly aid from the aircraft fuselage element , wherein the first guide device provided on the assembly aid to be removed from the aircraft fuselage element cooperates with the complementary guide device of the first rail element and the second guide device provided on the assembly aid to be removed from the aircraft fuselage element cooperates with the complementary guide device of the second rail element in order to enable a guided displacement of the assembly aid to be removed from the aircraft fuselage element relative to the rail system, and releasing the first and the second rail element of the rail system from the aircraft fuselage element.

14. A system for assembling a component in an aircraft having:

a rail system according to claim 1, and an assembly aid constructed to cooperate with the rail system.

15. The system according to claim 14, wherein the assembly aid is constructed in the form of a transport carriage for transporting the component into an aircraft fuselage element.

\* \* \* \* \*